United States Patent [19]
Pimpinella

[11] Patent Number: 5,257,332
[45] Date of Patent: Oct. 26, 1993

[54] OPTICAL FIBER EXPANDED BEAM COUPLER

[75] Inventor: Richard J. Pimpinella, Hampton, N.J.

[73] Assignee: AT&T Bell Laboratories, Murray Hill, N.J.

[21] Appl. No.: 941,289

[22] Filed: Sep. 4, 1992

[51] Int. Cl.⁵ .................... G02B 7/26; G02B 6/26
[52] U.S. Cl. .................... 385/59; 385/33; 385/35; 385/71; 385/74; 385/75; 385/52; 385/73
[58] Field of Search .............. 385/31, 33, 35, 49, 385/59, 51, 52, 65, 83, 92, 93, 14, 136, 137, 70, 71, 73, 74, 75

[56] References Cited

U.S. PATENT DOCUMENTS

| | | | |
|---|---|---|---|
| 4,214,812 | 7/1980 | de Mendez | 385/59 X |
| 4,368,949 | 1/1983 | Schmidt | 385/65 X |
| 4,422,717 | 12/1983 | Schmidt | 385/64 X |
| 4,468,087 | 8/1984 | Milan et al. | 385/64 X |
| 4,762,390 | 8/1988 | Finzel | 385/59 X |
| 4,772,088 | 9/1988 | Finzel | 385/59 X |
| 4,818,058 | 4/1989 | Bonanni | 385/59 X |
| 4,875,750 | 10/1989 | Spaeth et al. | 385/35 X |
| 5,073,003 | 12/1991 | Clark | 385/33 |
| 5,123,073 | 6/1992 | Pimpinella | 385/59 |
| 5,181,216 | 1/1993 | Ackerman et al. | 385/35 X |

FOREIGN PATENT DOCUMENTS

| | | | |
|---|---|---|---|
| 3809396 | 10/1989 | Fed. Rep. of Germany | 385/35 X |
| 59-36214 | 2/1984 | Japan | 385/35 X |

Primary Examiner—Brian Healy
Attorney, Agent, or Firm—Charles E. Graves

[57] ABSTRACT

Precise axial alignment of fibers to be connected is achieved with a male-to-male arrangement consisting of substantially identical fiber-receiving substrates and a coupler element which takes several configurations. A lensing element such as a ball/sphere is positioned in a well placed directly beyond a precision V-groove formed on a substrate surface, so that the fiber axes extend through substantially the center of the lensing element and are coaxial. The coupler contains a fiber-aligning V-groove and reference surface zones that interact in various ways with two ball-alignment elements of the substrates, to maintain critical substrate surfaces parallel to and precisely spaced from the coupler's reference surfaces.

7 Claims, 6 Drawing Sheets

OPTICAL FIBER EXPANDED BEAM COUPLER

FIELD OF THE INVENTION

This invention relates to optical fiber connectors and, more particularly, to a precision connector of the expanded beam coupling design fabricated, for example, as micromachined silicon optical subassemblies; and which provide low insertion loss with very highly repeatable connections in optical systems including backplanes.

BACKGROUND OF THE INVENTION

In Applicant's earlier patent, U.S. Pat. No. 5,123,073, issued on Jun. 16, 1992, there is described a precision optical fiber connection system in which the fiber-containing components are precision machined (i.e., etched) silicon substrates formed with V-grooves to contain the fibers. Lensing elements, which may be ball lenses, are fixably deployed in the V-grooves adjacent to the ends of each fiber. With appropriate housings, this system enables very quick and relatively inexpensive connection of one or more mating pairs of optical fibers in precise and stable coaxial alignment.

The advantages of the expanded beam coupling design derives in part from the increase in allowable misalignment tolerance over alternative fiber end butt coupling. The use of the etched or micromachined silicon subassemblies which contain the fibers provides a precision aligning mechanism of optical elements on the level of atomic crystallographic planes. The concept is finding increasingly widespread use in a variety of applications, including many which are required to meet very high stress and environmental objectives to withstand, for example, high levels of shock and vibration.

As the applications for this type of connector expand, it becomes necessary to realize an implementation which is simple and yet universally usable without substantial modifications despite a wide variety of uses. Importantly, the prior art expanded beam optical fiber connectors lack a useful male-to-male connection capability.

It also has been realized that the expanded beam coupling type of optical fiber connector of the present art lacks an important element of flexibility, namely the ability to contain the mating optical fiber ends in precise axial alignment while permitting the ends to be separated from one another within a defined range of distances, rather than having fixed the ends a set distance apart.

SUMMARY OF THE INVENTION

In its simplest form, the invention contemplates placing a first and a second fiber to be optically connected in physically identical optical fiber termini. Each terminus contains a precision optical fiber alignment V-groove that positions the end portion of each optical fiber. A lensing element, advantageously a ball/sphere, is positioned in a well formed directly beyond the precision V-groove. As in the prior art, the V-groove, the lensing element and its well are dimensioned to receive a predetermined diameter of stripped optical fiber and a lensing element of a predetermined diameter, such that when the components are in place, the fiber axes extend through substantially the center of the lensing element and are coaxial. In accordance with the present invention for each of the optical fiber termini, connector means are provided for engaging alignment surfaces of a separate coupler element, such that when the two optical fiber termini are placed on the coupler's surface, the two optical fiber ends are in precise axial alignment. Several optional expedients are taught hereinafter for achieving the precise axial alignment of the two optical fiber axis by use of surfaces of the coupler in relation to surfaces of the optical fiber termini or substrates, to achieve the fiber access alignments and to space the connected fiber ends within a range as needed.

DETAILED DESCRIPTION OF AN ILLUSTRATIVE EMBODIMENT

Figure 1:
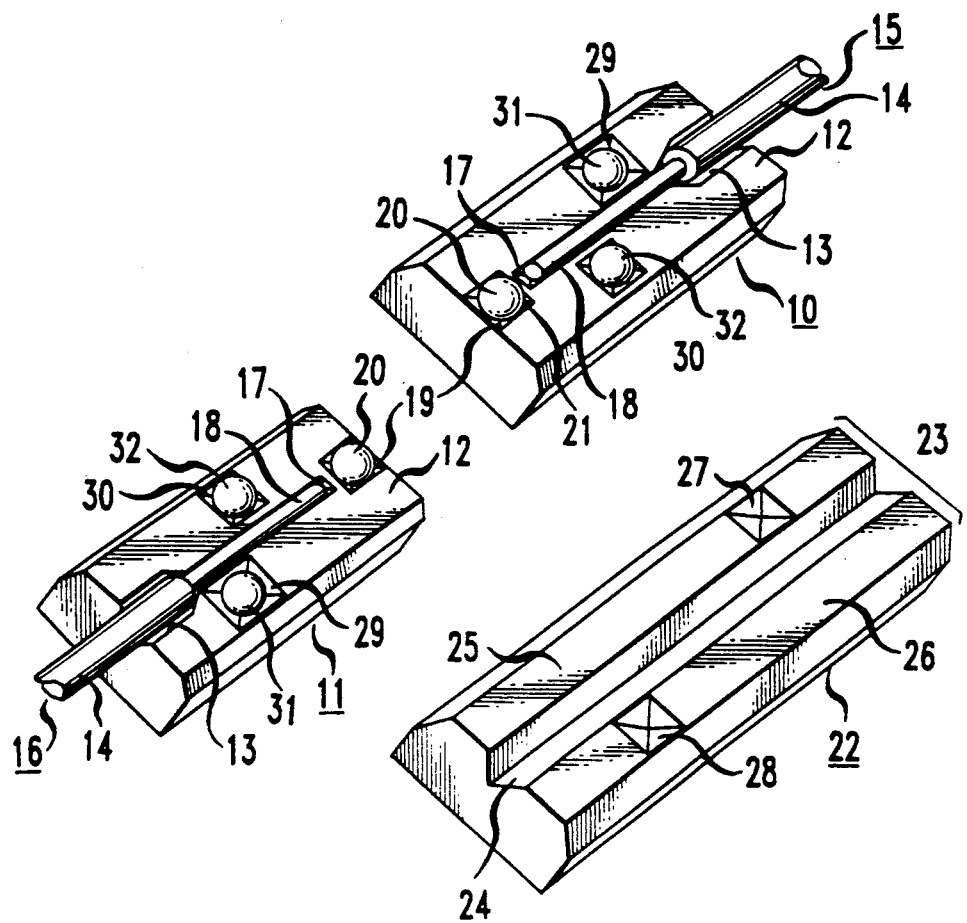
FIG. 1 is an assembly view in frontal perspective.

Referring to FIG. 1, there is shown a first optical fiber terminus or substrate denoted 10 and a second optical fiber substrate denoted 11. Each of the substrates 10, 11 is formed with a flat upper surface 12. Each of the surfaces 12 is formed with an entrance groove 13 which is relatively deep to receive the coated portion 14 of first and second optical fibers 15, 16 to be connected. Alternatively, the groove 13 which accommodates the coated portion of the fiber may be omitted if the coating itself is applied with precision as to thickness; and the precision groove 17 may be used to support a coated fiber end, thus avoiding where possible stripping the coating. In each of the substrates 10, 11 there is formed a precision V-groove denoted 17 which, as shown, intersects with the entrance groove 13. Precision groove 17 receives the fiber end portions 18 of the respective fibers 15, 16, stripped of their coating.

A well 19 is formed in each of the substrates 10, 11 just beyond the inner ends of the precision grooves 18. The well 19 contains a lensing element 20 which in this embodiment advantageously is a lens/sphere. Alternatively, the well 19 and the lensing element 20 may be configured to provide a pin in the shape of a cylinder having the same lensing ad spacing function. An example is described in Applicant's earlier patent U.S. Pat. No. 5,123,073. If the lensing elements are spherical, the well 19 advantageously is formed with tapered sides such as side in FIG. 1. The wells shown herein are formed with four tapered sides 21; but, it can be seen that the wells may be three-sided or five-sided in accordance with the design needs.

Pursuant to the invention, a coupler 22 shown in FIG. 1 provides surface details enabling the substrates 10, 11 to be assembled on coupler 22 in relative position which brings and keeps the optical fiber axes of the two fibers 15, 16 in alignment. Coupler 22 is formed with a flat surface 23 and an optical fiber alignment groove 24 disposed lengthwise along the surface, which, in this embodiment, extends end-to-end along the coupler 22. The groove 24 defines two surfaces 25, 26 on either side of the groove 24. These surfaces 25, 26 are coplanar and in effect comprise reference zones as hereinafter described. A first well or detent 27 is formed in surface 25 as shown in FIG. 1, to one side of groove 24; and a second well or detent 28 is formed in surface 26, at a position longitudinally offset from the detent 27. The wells 27, 28 may, however, be placed at any points on their respective surfaces 25, 26.

In accordance with the invention, referring again to FIG. 1, wells denoted 29, 30 are formed, on opposite sides of the fiber grooves 17, in the surface 12 of the respective substrates 10, 11. In each of the wells 29, there is placed an alignment element 31 which in the embodiment shown is an alignment sphere. When the substrates 10, 11 with their optical fibers 15, 16 in place are inverted and installed onto coupler 22, as shown in FIG. 2, the alignment spheres 31 respectively make contact with the flat surfaces 25, 26 of the coupler 22.

Further, in accordance with the invention, alignment elements 32, which in the instant embodiment are balls or spheres, are placed in the respective wells 30 of substrates 10, 11 which are located on the side of surface 13 opposite the wells 29. When the substrates 10, 11 are mated to coupler 22, the alignment spheres 32 are directed into the respective wells 27, 28 formed in the surfaces 25, 26 respectively, of coupler 22. FIG. 2 shows the lensing elements 20 held in their wells 19 within the substrates 10, 11 and also lodged in the V-groove 24 of coupler 22. In this position, as seen further in FIG. 3, the surface 23 of coupler 22 and the surfaces 12 of the respective substrates 10, 11 are parallel. The surfaces 12 are also co-planar. The alignment sphere 31 of the substrate 10 rests on surface 23 of the coupler 22 and, more specifically, rests on the coplanar surface 26. The alignment ball 32 in substrate 11 rests in the well 28. The alignment ball 32 of the substrate 10 lodges in the detent 27; and the alignment ball 31 associated with substrate 11 rests on surface 25.

Figure 2:
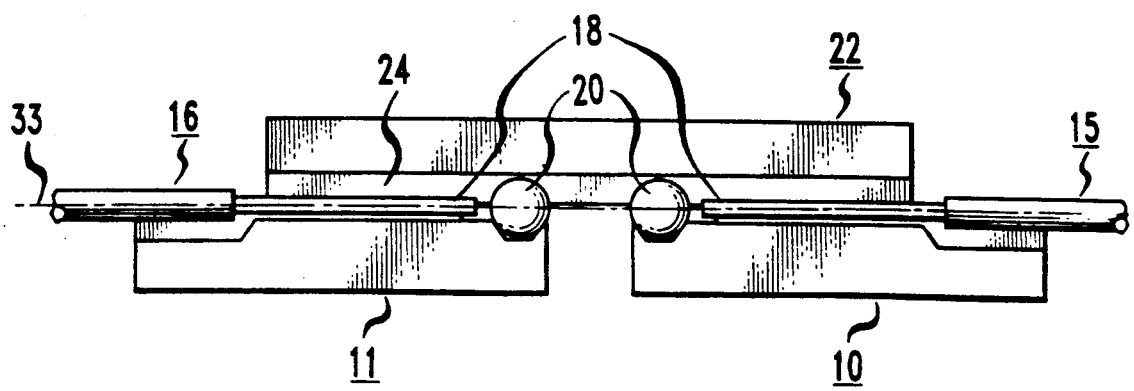
FIG. 2 is a front view sketch of an assembled embodiment of FIG. 1.
Figure 3:
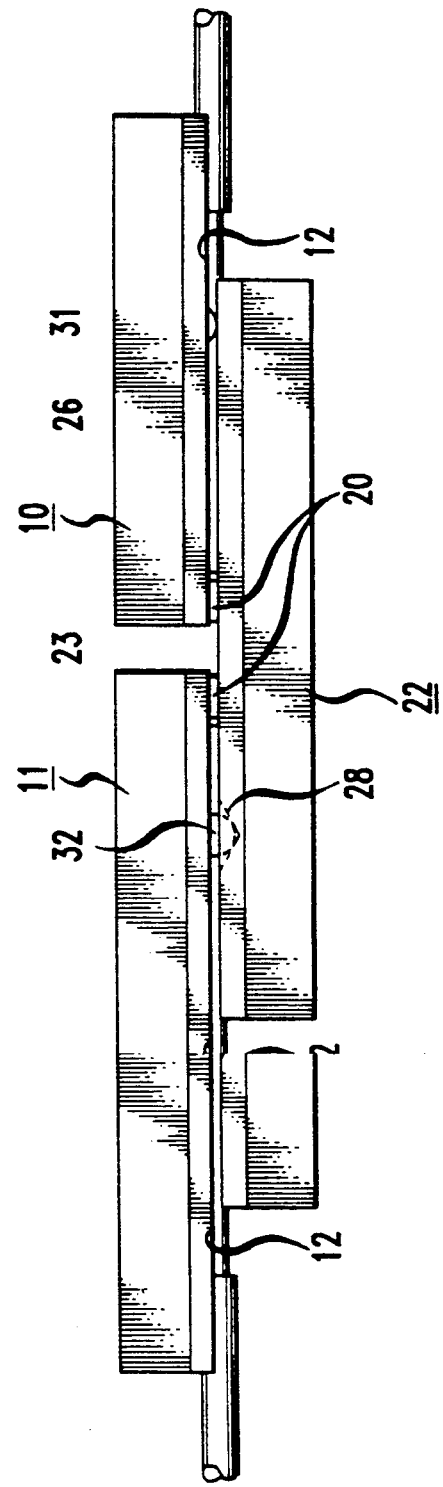
FIG. 3 is a further front view of the FIG. 1 embodiment.

Thus, in accordance with the invention, by selecting the size and depth as well as geometry of the alignment elements as above described, the two substrates 10, 11 are positioned by the coupler 22 such that the optical fiber axis, denoted 33 and shown in FIG. 2, is common for the two fibers 15, 16.

As noted, the substrates may be formed of silicon fabricated by known precision silicon etching processes. Alternatively, the substrates may be formed of plastic using molding techniques if of high enough precision.

Figure 9:
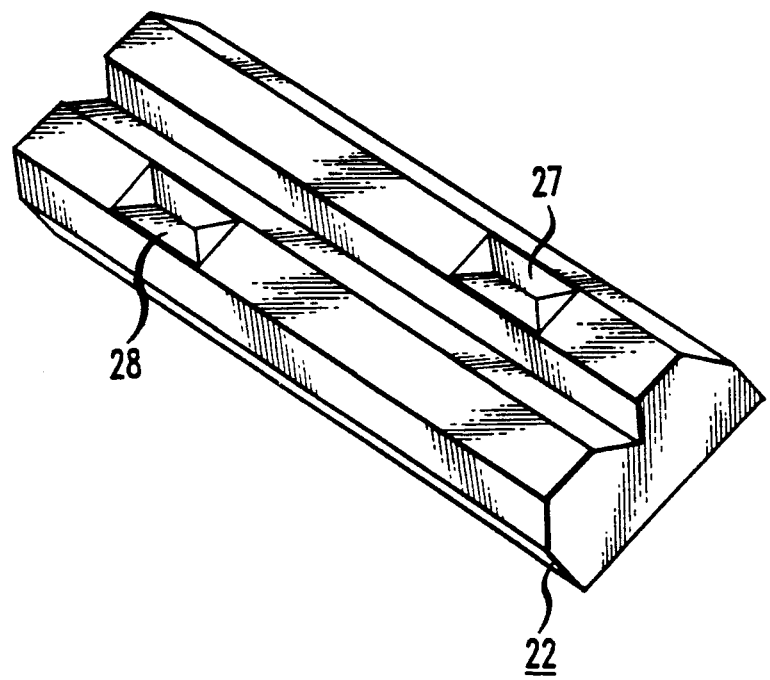
FIG. 9 is a variation of the embodiment of FIG. 1.

An alternative connector featuring elongated wells 28 is shown in FIG. 9. This expedient allows the alignment element which engages the elongated well to assume positions at any point along the length of the well, and thus permit adjustment of the separation between the lensing elements.

Figure 4:
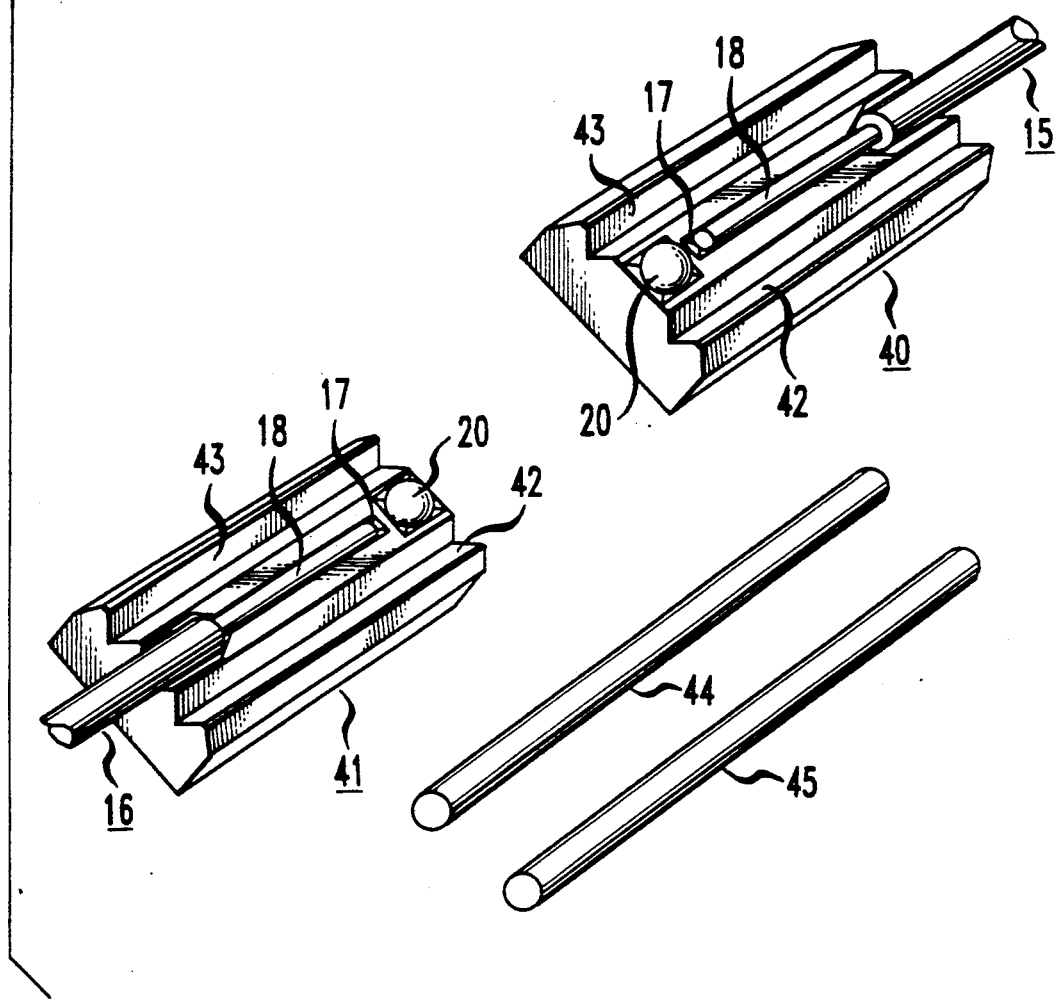
FIG. 4 is an assembly view of a second embodiment.

In the embodiment of FIGS. 1 and 2, the ends of the fibers and the lens/spheres 20 are positioned away from each other a fixed distance. In the embodiment next to be described, and in accordance with a further aspect of the invention, an alternative means is provided to enable a flexible positioning of the lens/spheres 20 and their fiber ends with respect to one another, while maintaining coaxial alignment of the optical fibers. Referring now to FIG. 4, there is shown an optical connector substrate 40, 41 each containing fibers 15, 16 in the deep/shallow V-groove configurations described with respect to FIG. 1. The two optical fibers 18 to be mated are in a shallow groove 17 with lens/spheres 20 disposed in detents just beyond the fiber ends.

A flat surface corresponding to the substrate surfaces 12 in FIG. 1 is formed on each of the substrates 40, 41 to contain two parallel grooves 42, 43. The grooves 42 in the substrates 40, 41 are of the same angularity and depth; and likewise the grooves 43 are of the same angularity and depth. The grooves 42, 43 of substrate 40 are spaced from each other the same distance as are grooves 42, 43 of substrate 41.

In accordance with the invention, connection of the optical fibers 15, 16 is effected by placing alignment pins 44, 45 into the respective grooves 42, 43 and bringing the two substrates 40, 41 down onto the pins. By selecting the dimensions and geometry of the grooves 42, 43 and the alignment pins 44, 45 appropriately, it will be appreciated that the axes of the respective fibers 15, 16 are brought into and maintained in axial alignment. At the same time, the substrates 40, 41 may be adjusted in their relative spacing.

Figure 5:
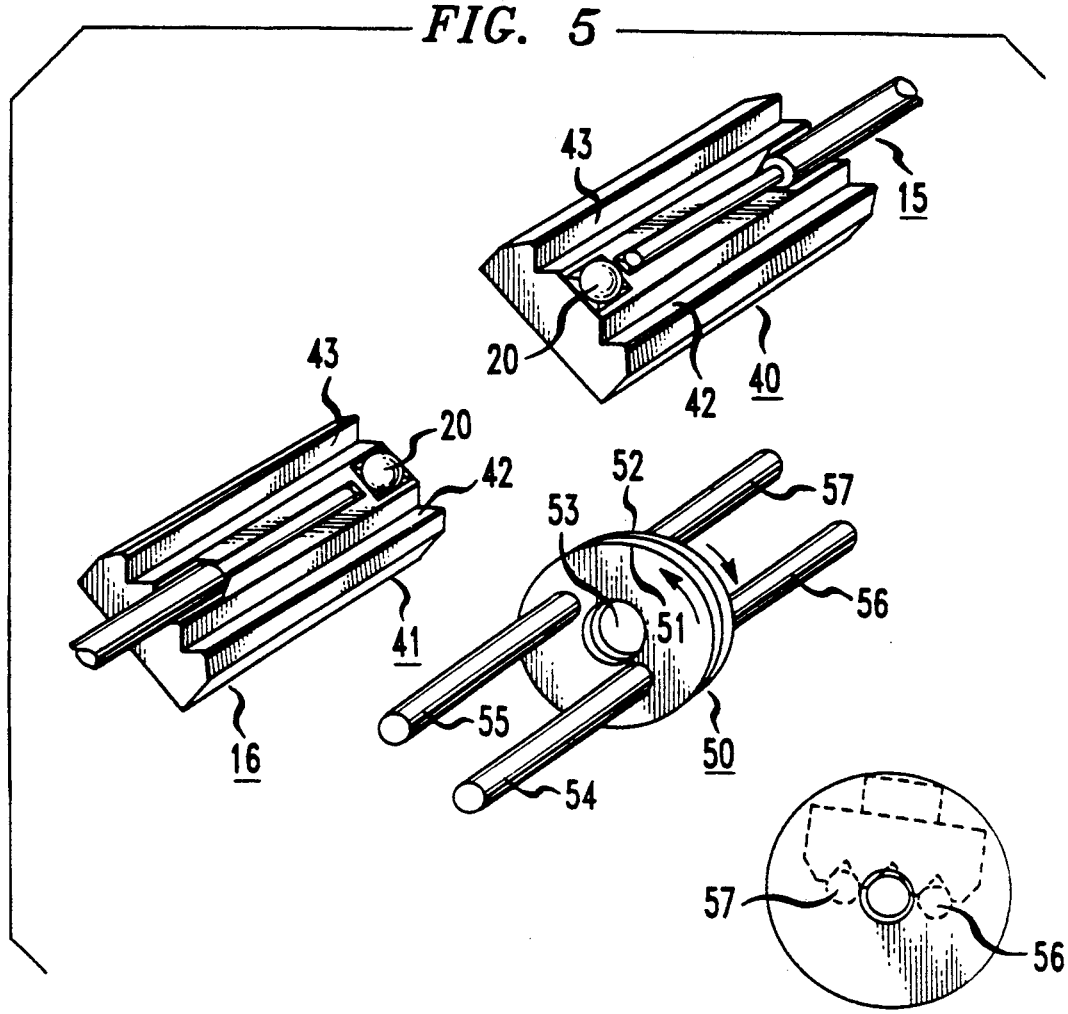
FIG. 5 is an assembly view of a third embodiment.

In a variation of the inventive embodiment depicted in connection with FIG. 4. FIG. 5 shows the two substrates 40, 41 mounting optical fibers 15, 16 and provided with alignment grooves 42, 43 on each of the substrates. In accordance with this variation of the invention, a connector denoted 50 in FIG. 5 consists of two discs 51, 52 of like size and shape. The center aperture 53 of the discs 51, 52 is wide enough to pass substantial light between optical fiber focusing element such as 20. Rods 54, 55 are attached to the side surface of disc 51 and similar rods 56, 57 are attached to a lateral surface of disc 52 as seen in FIG. 5.

Figure 6:
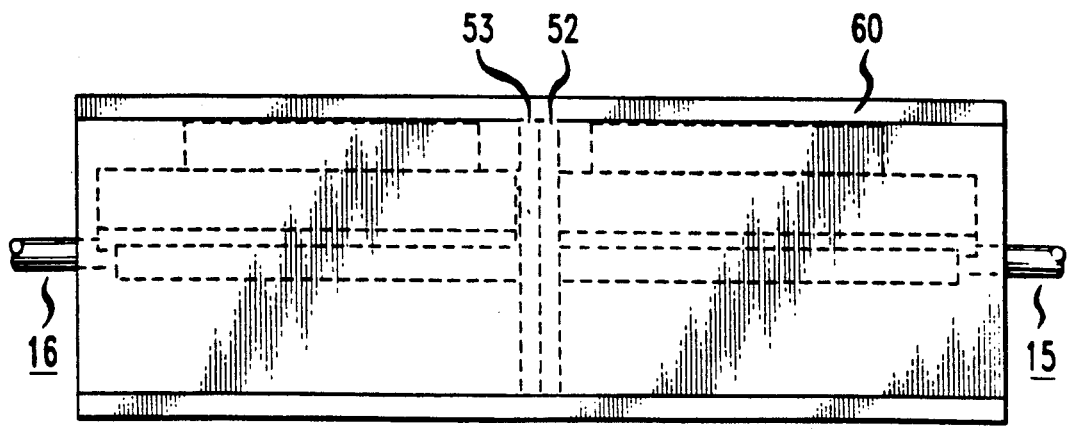
FIG. 6 is a frontal view of the FIG. 5 embodiment as assembled.

A further advantage to the inventive variation shown in FIGS. 5 and 6 is that, advantageously, once the substrates 40, 41 are mounted within the sleeve 60, it is possible for the discs 51, 52 to undergo relative rotation with respect to each other in the directions shown by the arrows of FIG. 5, without the fibers 15, 16 getting out of axial alignment.

The rods 54, 56 are coaxial when the discs are abutted; and, likewise, the rods 55, 57 are coaxial. Essentially, the overall connector structure 50 shown in FIG. 5 fulfills the same role as the combination of the two rods 44, 45 in FIG. 4. That is, with the discs 51, 52 in direct surface-to-surface relation, as seen in FIG. 5, the rods 55, 57 fit in the grooves 43 of the substrates 40, 41, and the rods 54, 56 fit in the grooves 42 of these substrates. The corresponding guiding V-grooves of the two substrates are brought into exact end-to-end orientation to create essentially a continuous pair of grooves 42, 43 across the two substrates.

One means for securing the substrates 40, 41 and the connector 50 together in abutting alignment, is to place the assembly shown in FIG. 5 in the interior of a sleeve such as sleeve 60 shown in FIG. 6, with the discs 51, 52 frictionally engaged within the sleeves 60 and facially abutting each other.

Although this embodiment defines a single fiber-to-fiber connector, persons skilled in the art will realize that the disc/pin configuration will support connection of two or more concentrically placed fibers as well.

Figure 7:
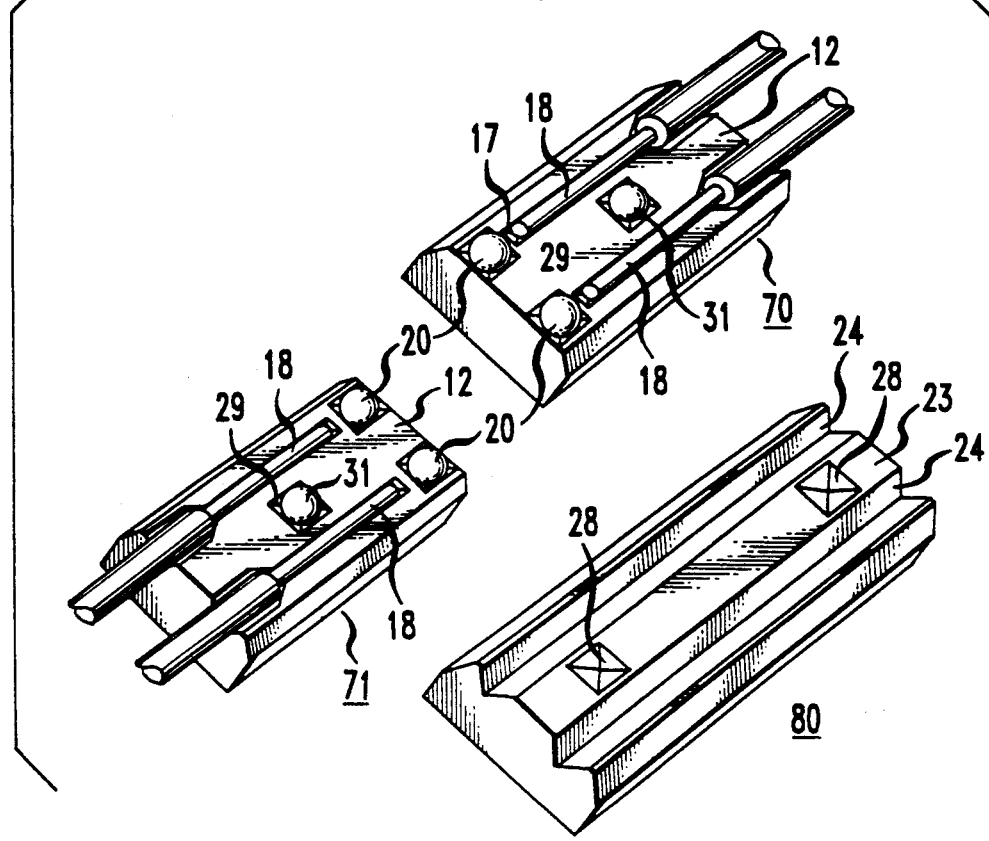
FIG. 7 is an assembly view of a fourth embodiment.
Figure 8:
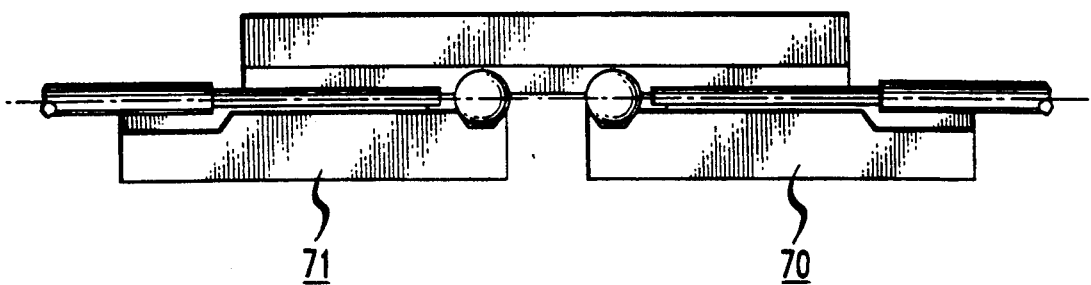
FIG. 8 is a front view of the embodiment of FIG. 7.

In a still further variation of the invention depicted in FIGS. 7 and 8, the concept of FIG. 1 is extended to mounting a multiplicity of optical fibers on substrates and then joining them through a overlay connector. Specifically, substrates 70 and 71 have substantially the same fiber-receiving V-groove configurations as are shown in FIG. 1. The stripped fiber ends 18 are mounted in precision V-grooves 17, and the lens/spheres 20 likewise have the same configuration and purpose as earlier described for those in FIG. 1. In accordance with this inventive variant, however, only one alignment sphere 31 is provided in a detent 29 on the substrate surfaces 12.

The connector element in the embodiment of FIGS. 7 and 8, designated 80, has a precision planar surface 23 in which are formed two detents 28 along the center line. These detents receive the alignment balls 31 when the substrates 70, 71 are inverted and placed onto the connector 80. In the inverted position, it is seen that the lens/spheres 20 align into the grooves 24 of the connector 80. FIG. 8 shows the connector of this inventive variation in its assembled position, with the fibers in axial alignment.

Figure 10:
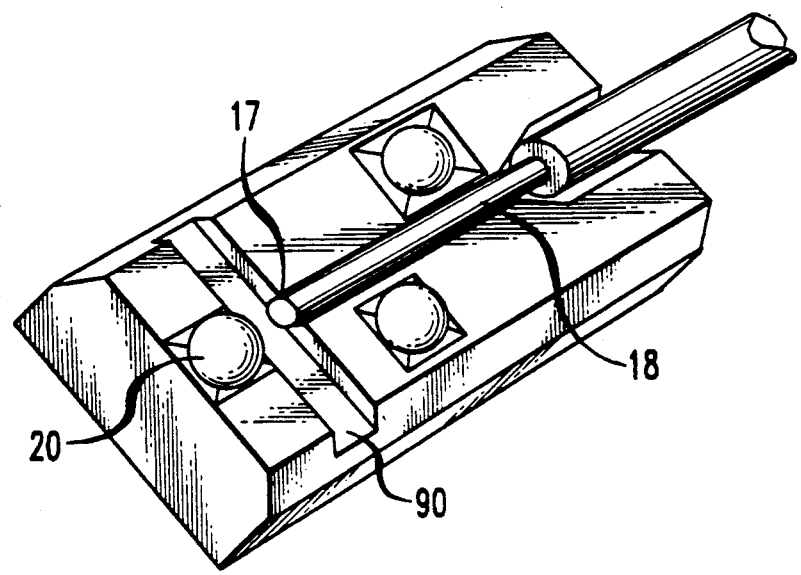
FIG. 10 is a perspective view illustrating a further substrate structure.

FIG. 10 shows a variations of the structure of substrates such as 10, 11 which allows more light to be passed between the fiber and the lensing element. A channel 90 is cut across the substrate material between the precision V-groove 17 and the indent 19. The fiber 18 extends out over the channel 90. This design assures, where necessary, that no light-blocking material intervenes between the fiber and the element.

I claim:

1. Apparatus for connecting one or more optical fibers of a first set of fibers to corresponding optical fibers of a second set, comprising:
   first and second fiber-receiving substrates each said substrate comprising:
   one or more fiber-receiving V-grooves formed on a exterior flat surface of each said substrate;
   an indent formed between the end of each said V-groove and the adjacent end of the substrate;
   a lensing element fixedly placed in each said indent in a position which extends the axis of an optical fiber through the center of said lensing element;
   first and second wells formed into said flat surface of each said substrate;
   an alignment element disposed in each said well; and
   a planar exterior surface;
   one or more fiber alignment grooves disposed lengthwise along said surface;
   first and second reference zones defined within said exterior surface, each said zone containing a one of said wells;
   one alignment element of each said substrate adapted to engage into said well of said first reference zone; and
   the other of said alignment elements adapted to engage the surface of said second reference zone; whereby when said first and second substrates are placed into mating engagement on said coupler, the two said exterior surfaces of said substrates are coplanar and are both parallel to said reference zones; and the extended axes of corresponding said fibers are coaxial and pass through the centers of said lensing elements.

2. Apparatus in accordance with claim 1, wherein said connector wells are elongate thereby to afford limited longitudinal travel of either said substrate when engaged on said connector.

3. Apparatus in accordance with claim 1, wherein said fiber alignment grooves comprise two; and wherein said first and second reference zones are positioned between said alignment grooves.

4. Apparatus for connecting one or more optical fibers of a first set of fibers to corresponding optical fibers of a second set, comprising:
   first and second fiber-receiving substrates each said substrate comprising:
   one or more fiber-receiving V-grooves formed on a exterior flat surface of each said substrate;
   an indent formed between the end of each said V-groove and the adjacent end of the substrate;
   a lensing element fixedly placed in each said indent in a position which extends the axis of an optical fiber through the center of said lensing element;
   at least two groove-wells formed into said flat surface of each said substrate; and
   a coupler comprising
   at least two elongate pin alignment elements adapted to be disposed in said groove wells; connection between said first and said second substrates being effected by inserting said pins into corresponding said groove-wells; whereby the corresponding groove-wells of said substrates are aligned; and in that position the extended axes of corresponding said fibers are coaxial and pass through the centers of said lensing elements.

5. Apparatus for connecting one or more optical fibers of a first set of fibers to corresponding optical fibers of a second set, comprising:
   first and second fiber-receiving substrates each said substrate comprising:
   one or more fiber-receiving V-grooves formed on a exterior flat surface of each said substrate;
   an indent formed between the end of each said V-groove and the adjacent end of the substrate;
   a lensing element fixedly placed in each said indent in a position which extends the axis of an optical fiber through the center of said lensing element;
   at least two groove-wells formed into said exterior surface of each said substrate, said grooves being parallel to each other and to said V-grooves; and
   a coupler comprising
   first and second elongate pin alignment elements each comprising a pair of pins mounted in parallel relation on a disc having a center aperture; said first and second pins of each said alignment element adapted to be disposed in the groove-wells of said first and second substrate respectively; whereby when said alignment elements are installed into said groove wells, the extended axes of corresponding said fibers are coaxial and pass through the centers of said lensing elements and through said disc apertures.

6. Apparatus in accordance with claims 1, 2, 3, 4, or 5, wherein said lensing element is a lensing sphere.

7. Apparatus in accordance with claims 1, 2, 3, 4, or 5, further comprising a channel formed in the substrate surface between the end of each said fiber and said lensing element indent, and wherein the optical axes of said fibers and the centers of said lensing elements are located above the plane of said exterior flat surface of said substrates.

* * * * *